US006772367B1

(12) United States Patent
Tarafdar et al.

(10) Patent No.: US 6,772,367 B1
(45) Date of Patent: Aug. 3, 2004

(54) SOFTWARE FAULT TOLERANCE OF CONCURRENT PROGRAMS USING CONTROLLED RE-EXECUTION

(75) Inventors: Ashis Tarafdar, Newton, MA (US); Vijay K. Garg, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 477 days.

(21) Appl. No.: 09/687,882

(22) Filed: Oct. 13, 2000

Related U.S. Application Data

(60) Provisional application No. 60/159,253, filed on Oct. 13, 1999.

(51) Int. Cl.[7] .............................................. G06F 11/00
(52) U.S. Cl. ........................................ 714/11; 714/10
(58) Field of Search ............................. 714/10, 11, 12, 714/20, 21

(56) References Cited

U.S. PATENT DOCUMENTS

| | | | | |
|---|---|---|---|---|
| 4,358,823 A | * | 11/1982 | McDonald et al. ........... 714/11 |
| 5,016,249 A | * | 5/1991 | Hurst et al. .................... 714/24 |
| 5,249,187 A | * | 9/1993 | Bruckert et al. ............... 714/11 |
| 5,423,024 A | * | 6/1995 | Cheung ......................... 714/11 |
| 5,440,726 A | | 8/1995 | Fuchs et al. .............. 395/82.18 |
| 5,530,802 A | | 6/1996 | Fuchs et al. ............ 395/182.15 |
| 5,590,277 A | * | 12/1996 | Fuchs et al. .................... 714/38 |
| 6,038,684 A | * | 3/2000 | Liddell et al. .................. 714/11 |
| 6,058,491 A | * | 5/2000 | Bossen et al. ................. 714/15 |
| 6,161,196 A | * | 12/2000 | Tsai .............................. 714/10 |
| 6,173,414 B1 | * | 1/2001 | Zumkehr et al. ............... 714/6 |

\* cited by examiner

*Primary Examiner*—Nadeem Iqbal
*Assistant Examiner*—Timothy M Bonura
(74) *Attorney, Agent, or Firm*—Gardere Wynne Sewell LLP

(57) ABSTRACT

A method for fault tolerance in concurrently executing computer programs is presented. The present invention controls the re-execution of concurrent programs in order to avoid a recurrence of synchronization failure. The invention (i) traces an execution, (ii) detects a synchronization failure, (iii) determines a control strategy, and (iv) re-executes under control. Control is achieved by tracing information during an execution and using this information to add synchronizations during the re-execution.

14 Claims, 2 Drawing Sheets

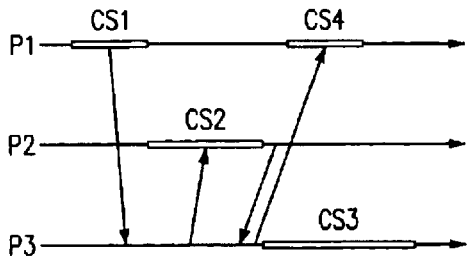

FIG. 1a

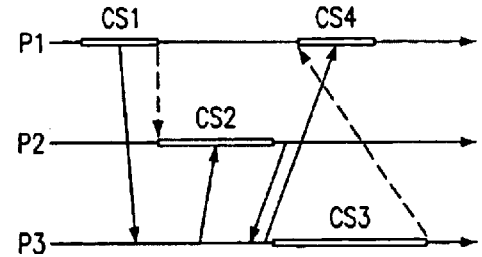

FIG. 1b

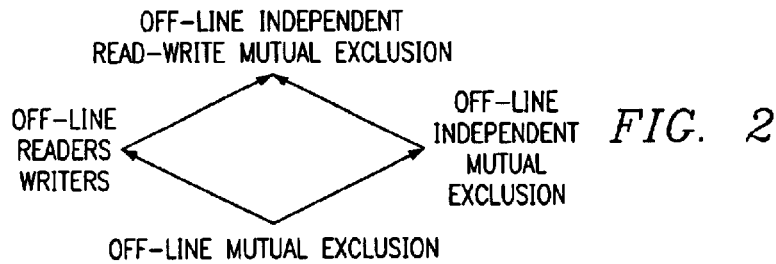

FIG. 2

```
Types:   state:              (pid: int; v: vector_clock);
         critical_section:   (pid: int; first: state; last: state;
                              cs_id: integer; write_critical; boolean);
         strongly_conn_component: set of critical_section;
Input:   C₁, C₂, ···, Cₙ:    list of critical_section
Output:  O;                  list of (state, state), initially null
Vars:    scc_set,crossable:  set of strongly_conn_component
         crossed,prev,curr:  strongly_conn_component
         cs,cs':             critical_section
         ordered:            list of strongly_conn_component while (∀i: C₁ ≠ null) do
   scc_set := get_scc(C₁.head, C₂.head, ···, Cₙ.head)
   crossable := { s ∈ scc_set | ∀s'∈ scc_set, s' ≠ s: s' -/+ s }
   crossed := select(crossable);
   if (not_valid(crossed)) then
       exit("No Controlled Computation Exists");
   for each cs in crossed do
       C_co.pdd_delete_head();
   ordered.add_head(crossed);
prev := ordered.delete_head();
while (ordered ≠ null) do
   curr := ordered.delete_head();
   for each cs in prev and cs' in curr do
       if (cs.last -/+ cs'.first) then
           O.add_head(cs.last, cs'.first);
```

FIG. 3

SOFTWARE FAULT TOLERANCE OF CONCURRENT PROGRAMS USING CONTROLLED RE-EXECUTION

This application is a conversion from and claims priority of U.S. Provisional Application No. 60/159,253, filed Oct. 13, 1999.

FIELD OF THE INVENTION

The present invention is generally directed to methods for correcting synchronization faults in concurrently executed computer programs and, more particularly, to methods and systems for fault tolerance of concurrently executed software programs using controlled re-execution of the programs.

BACKGROUND OF THE INVENTION

Concurrent programs are difficult to write. The programmer is presented with the task of balancing two competing forces: safety and liveness. Frequently, the programmer leans too much in one of the two directions, causing either safety failures (e.g. races) or liveness failures (e.g. deadlocks) Such failures arise from a particular kind of software fault (bug), known as a synchronization fault. Studies have shown that synchronization faults account for a sizeable fraction of observed software faults in concurrent programs. Locating synchronization faults and eliminating them by reprogramming is always the best strategy. However, many systems must maintain availability in spite of software failures. Concurrent programs include all parallel programming paradigms such as multi-threaded programs, shared-memory parallel programs, message-passing distributed programs, distributed shared-memory programs, etc. A parallel entity may be referred to as a process, although in practice it may also be a thread.

Traditionally, it was believed that software failures are permanent in nature and, therefore, they would recur in every execution of the program with the same inputs. This belief led to the use of design diversity to recover from software failures. In approaches based on design diversity, redundant modules with different designs are used, ensuring that there is no single point-of-failure. Contrary to this belief, it was observed that many software failures are, in fact, transient (they may not recur when the program is re-executed with the same inputs). In particular, the failures caused by synchronization faults are usually transient in nature.

The existence of transient software failures motivated a new approach to software fault tolerance based on rolling back the processes to a previous state and then restarting them (possibly with message reordering), in the hope that the transient failure will not recur in the new execution. Methods based on this approach have mostly relied on chance in order to recover from a transient software failure. In the special case of synchronization faults, however, it is desirable to do better.

It would therefore be desirable to be able to bypass a synchronization fault and recover from the resulting failure.

SUMMARY OF THE INVENTION

The present invention controls the re-execution of concurrent programs in order to avoid a recurrence of the synchronization failure. The invention provides a method of (i) tracing an execution, (ii) detecting a synchronization failure, (iii) determining a control strategy, and (iv) re-executing under control.

Control is achieved by tracing information during an execution and using this information to add synchronizations during the re-execution.

In accordance with the present invention, a method of providing fault tolerance in concurrently executing computer programs by controlling the re-execution of concurrent programs in order to avoid a recurrence of synchronization failures is provided, comprising:

(a) tracing the execution of concurrent programs;

(b) detecting synchronization failures resulting from said execution of the concurrent programs; and (c) applying a control strategy, based on said detection of failures, for said execution of the concurrent programs.

Also in accordance with the present invention, application of a control strategy includes causing a re-execution of said concurrent programs under a control derived from tracing information during an execution, and wherein said control includes using said information to add synchronizations to said concurrent programs during re-execution.

DETAILED DESCRIPTION OF THE DRAWINGS

For a more complete understanding of the invention and for application of further advantages thereof, reference is now made to the following description or preferred embodiments taken in conjunction with the accompanying drawings, in which:

FIG. 1 is an illustration of a tracing and controlling during rollback recovery;

FIG. 2 is an illustration of variants of Off-line exclusions;

FIG. 3 is an illustration of the algorithm used for Off-line independent read-write mutual exclusion;

DETAILED DESCRIPTION OF A PREFERRED EMBODIMENT

Figure 5A:
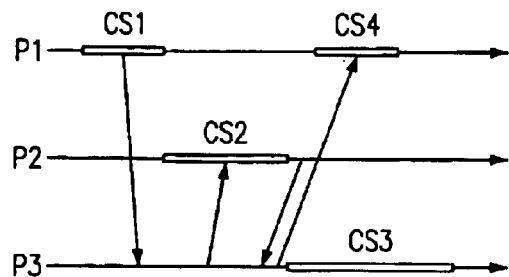
FIG. 5 is an illustration of tolerating races in a concurrent execution.

In accordance with the present, methods for tolerating transient synchronization failure in software is provided. The present invention controls the re-execution of concurrent programs, based on information traced during a failed execution. The following description will describe the management of races, tracing, failure detection, and re-execution under control in great depth.

Referring to FIG. 1, illustrated is an example of tracing and controlling during rollback recovery. To illustrate what determining a control strategy involves, consider the execution shown in FIG. 1(a). CS1–CS4 are the critical sections of the execution. The synchronizations between processes are shown as arrows from one process execution to another. A synchronization ensures that the execution after the head of the arrow can proceed only after the execution before the tail has completed. A race occurs when two critical sections execute simultaneously. For example, CS1 and CS2 may have a race, since the synchronizations do not prevent them from executing simultaneously. A control strategy is a set of added synchronizations that would ensure that a race does not occur. The race can be avoided by adding synchronizations, shown as broken arrows in FIG. 1(b).

The present invention allows for the development of a control strategy by determining which synchronizations to add to an execution trace in order to tolerate a synchronization fault during the re-execution of a computer program, or programs, encountering fault. This proves to be an important problem in its own right and can be applied in areas other than software fault tolerance, such as concurrent debugging. The problem is generalized using a framework known as the off-line predicate control problem. The problem, as it applied to debugging, was introduced in a paper entitled "Predicate control for active debugging of distributed programs," by A. Tarafdar and V. K. Garg. IEEE Proceedings of the $9^{th}$ symposium on Parallel and Distributed Processing, Orlando, USA, April 1998. Informally, off-line predicate control specifies that, given a computation and a property on the computation, one must determine a controlled computation (one with more synchronizations) that maintains the property (used is the term computation for a formal model of an execution). Previous attempts solved the predicate control problem for a class of properties called disjunctive predicates. Applying the results of the Tarafdar et al. study to software fault tolerance would mean avoiding synchronization failures of the form: $l_1 \hat{} l_2 \hat{} l_3$, where $l_1$ is a local property specified on process $P_1$. For example, if $l_1$ specifies that a server is unavailable, the synchronization failure is that all servers are unavailable at the same time.

The invention addresses a class of off-line predicate control problems, characterized by the mutual exclusion property, that is especially useful in tolerating races. Four classes of mutual exclusion properties are considered: off-line mutual exclusion, off-line readers writers, off-line independent mutual exclusion, and off-line independent read-write mutual exclusion. For each of these classes of properties, necessary and sufficient conditions under which the problem may be solved are determined. Furthermore, an efficient algorithm that solves the most general of the problems, off-line independent read-write mutual exclusion, is presented, which also solves each of the other three problems. The algorithm takes $O(np)$ time, where n is the number of concurrent processes and p is the number of critical sections.

The said problems have been termed off-line problems to distinguish them from their more popular on-line variants (i.e. the usual mutual exclusion problems). The difference between the on-line and off-line problems is that in the on-line case, the computation is provided on-line, whereas in the off-line case, the computation is known a priori. Ignorance of the future makes on-line mutual exclusion a harder problem to solve.

In general, in on-line mutual exclusion, one cannot avoid deadlocks without making some assumptions (e.g. critical sections do not block). Thus, on-line mutual exclusion is impossible to solve. To understand why this is true, consider the scenario in FIG. 1. Any on-line algorithm, being unaware of the future computation, would have a symmetric choice of entering CS1 or CS2 first. If CS2 is entered first, it would result in a deadlock. An off-line algorithm, being aware of the future computation, could make the correct decision to enter CS1 first and add a synchronization from CS1 to CS2. There will always be scenarios where on-line mutual exclusion algorithms will fail, resulting in either race conditions or deadlocks. In such scenarios, controlled re-execution based on off-line mutual exclusion becomes vitally important.

The model that is now presented is of a single execution of the concurrent program. The model is not at the programming language level, but at a lower level, at which the execution consists of a sequence of states for each process and the communications that occurred among them, let S be a finite set of elementary entities known as states. S is partitioned into subsets $S_1, S_2, \ldots, S_n$, where $n>1$. These partitions correspond to n processes in the system. A subset G of S is called a global state if $\forall i: |G \cap S_i|=1$. Let $G_i$ denote the unique element in $G \cap S_i$. A global predicate is a function that maps a global state onto a boolean value.

A computation is a partial order $\rightarrow$ on S such that $\forall i: \rightarrow_i$ is a total order on $S_i$, where $\rightarrow_i$ represents $\rightarrow$ restricted to the set $S_i$. Note that the states in a single process are totally ordered while the states across processes are partially ordered. We will use $\rightarrow, \rightarrow^k, \rightarrow^c$ to denote computations, and $\|, \|^k, \|^c$ to denote the respective incomparability relations (e.g. $s\|t \equiv (s \not\rightarrow t) \wedge (t \not\rightarrow s))$. Given a computation $\rightarrow$ and a subset K of S, $\rightarrow$-consistent $(K) \equiv \forall s, t \in K \; s\|t$. In particular, a global state may be $\rightarrow$-consistent. The notion of consistency indicates when a set of states could have occurred concurrently in a computation.

A computation $\rightarrow$ is extensible in S if:

$$\forall K \subseteq S: \rightarrow\text{-consistent } (K) \rightarrow \exists \text{global state } G \supseteq K: \rightarrow\text{-consistent } (G)$$

Intuitively, extensibility allows for the extension of a consistent set of states to a consistent global state. Any computation in S can be made extensible by adding "dummy" states to S. Therefore, it can be implicitly assumed that any computation is extensible.

Given a computation $\rightarrow$, let $\leq$ be a relation on global states defined as: $G \leq H \equiv \forall i: (G_i \rightarrow^i H_i) \vee (G_i = H_i)$. It is a well-known fact that the set of $\rightarrow$-consistent global states is a lattice with respect to the $\leq$ relation. In particular, $\rightarrow$-glb (G,H) is used for the greatest lower bound of G and H with respect to $\rightarrow$ (so, $\rightarrow$-glb(G,H)$_i \equiv \rightarrow_i$-min $(G_i, H_i)$). If G and H are $\rightarrow$-consistent, then $\rightarrow$-glb(G,H) is also $\rightarrow$-consistent.

Given a computation $\rightarrow$ and a global predicate B, a computation $\rightarrow^c$ is called a controlling computation of B in $\rightarrow$ if (1) $\rightarrow \subseteq \rightarrow^c$, and (2) $\forall G: \rightarrow^c$-consistent(G)$\rightarrow$B(G). This indicates that a controlling computation is a stricter partial order (containing more synchronizations). Further, any global state that may occur in the controlling computation must satisfy the specified global predicate. Thus, the problem of finding a controlling computation is to add synchronizations until all global states that violate the global predicate are made inconsistent.

In the paper by Tarafdar et al., it was proved that the Off-line Predicate Control is NP-Hard. Therefore, it is important to solve useful restricted forms of the Off-line Predicate Control Problem. Since it is desirable to avoid race conditions, the general problem is restricted by letting B specify the mutual exclusion property.

Referring to FIG. 2, an illustration of variants of off-line mutual exclusion is provided. The simplest specification for mutual exclusion is: no two critical sections execute at the same time. This corresponds to the semantics of a single exclusive lock for all the critical sections. The corresponding problem can be referred to as an Off-line Mutual Exclusion Problem. This can be generalized to the Off-line Readers Writers Problem by specifying that only critical sections that "write" must be exclusive, while critical sections that "read" need not be exclusive. This corresponds to the semantics of read-exclusive-write locks. Another way to generalize the Off-line Mutual Exclusion Problem is to allow the semantics of independent locks. In this Off-line Independent Mutual Exclusion Problem, no two critical sections of the same lock can execute simultaneously. Finally, critical sections may be associated with the semantics of independent read-exclusive-write locks. This is the Off-line Independent Read-Write Mutual Exclusion Problem. FIG. 2 illustrates the relative generality of the four problems.

In traditional on-line mutual exclusion, there has been no "independent" variant, since it trivially involves applying the same algorithm for each lock. However, in off-line mutual exclusion, such an approach will not work, since the synchronizations added by each independent algorithm may cause deadlocks when applied together.

For the practitioner, an algorithm which solves Off-line Independent Read-Write Mutual Exclusion would suffice, since it can be used to solve all other variants. For the purpose of describing the invention in straight-forward terms, however, the simplest off-line mutual exclusion Problem will be described in generalized steps. For each problem, the necessary and sufficient conditions for finding a solution will also be described.

Off-line Mutual Exclusion is a specialization of Off-line Predicate Control to the following class of global predicates:

$$B_{mutex}(G) \equiv \forall \text{distinct } s,t \in G: \neg(\text{critical}(s) \land \text{critical}(t))$$

where critical is a function that maps a state onto a boolean value. Thus, $B_{mutex}$ specifies that at most one process may be critical in a global state.

Based on the critical boolean function on states, critical sections are defined as maximal intervals of critical states. More precisely; given a critical function on S and a computation $\rightarrow$ on S, a critical section, CS, is a non-empty, maximal subset on a $S_i$ such that: (1) $\forall s \in CS$: critical(s), and (2) $\forall s,t \in CS$: $\forall u \in S_i$: $s \rightarrow u \rightarrow t \Rightarrow u \in CS$.

Let CS.first and CS.last be the minimum and maximum states respectively in CS (w.r.t. $\rightarrow_i$). Let $\mapsto$ be a relation on critical sections defined as: $CS \mapsto CS' \equiv CS.\text{first} \rightarrow CS'.\text{last} \land CS \neq CS'$ Thus, $\mapsto$ orders a critical section before another if some state in the first happened before some state in the second. Note that $\mapsto$ may have cycles.

All computations will have the same total order $\rightarrow_i$ for each $S_i$. Therefore, the set of critical sections will not change for each computation. However, the $\mapsto$ relation will change, in general. For computations $\rightarrow$, $\rightarrow^k$, and $\rightarrow^c$, the relation on critical sections will be denoted as $\mapsto$, $\mapsto^k$ and $\mapsto^c$ respectively.

Theorem 1 (Necessary Condition) For a computation $\rightarrow$ of S, and a global predicate $B_{mutex}$, a controlling computation of $B_{mutex}$ in $\rightarrow$ exists $\Rightarrow \mapsto$ has no cycles Proof: The contrapositive is proved. Let $\mapsto$ have a cycle, say $CS_1 \mapsto CS_2 \mapsto \ldots CS_m \mapsto CS_1$, ($m \geq 2$) and let $\rightarrow^c$ be a computation such that $\subseteq \rightarrow^c$. Since $\rightarrow^c$ cannot have a cycle, at least one of: $CS_1.\text{last} \not\rightarrow^c CS_2.\text{first}$, $CS_2.\text{last} \not\rightarrow^c CS_3.\text{first}$, ..., and $CS_m.\text{last} \not\rightarrow^c CS_1.\text{first}$ must hold. Without loss of generality, let $CS_1.\text{last} \not\rightarrow^c CS_2.\text{first}$. Also $CS_2.\text{last} \not\rightarrow^c CS_1.\text{first}$ (since $CS_1 \mapsto CS_2$) Since $\rightarrow^c$ is extensible, $s_2$ can be defined as the maximum state in $S_2$ such that $CS_1.\text{last}||^c s_2$ and $s_1$ as the maximum state in $S_1$ such that $CS_2.\text{last}||^c s_1$. By extensibility of $\rightarrow^c$, $\rightarrow^c$-consistent global states $G_1$ and $G_2$ can be found containing $\{CS_1.\text{last}, s_2\}$ and $\{CS_2.\text{last}, s_1\}$ respectively. There are now two cases:

Case 1: $[s_1 \in CS_1 \lor s_2 \in CS_2]$ In this case $\neg B_{mutex}$. ($G_1$).

Case 2: $[s_1 \notin CS_1 \land s_2 \notin CS_2]$ Since $s_1 \notin CS_1$, there are two ways to position $s_1$: (a) $s_1 \rightarrow^c CS_1.\text{first}$ or (b) $CS_1.\text{last} \rightarrow^c s_1$. In sub-case (a), since $CS_2.\text{last} \not\rightarrow^c CS_1.\text{first}$, either $CS_2.\text{last}||^c CS_1.\text{first}$ or $CS_1.\text{first} \rightarrow^c CS_2.\text{last}$, which gives $s_1 \rightarrow^c CS_2.\text{last}$. Both possibilities contradict the definition of $s_1$. This leaves sub-case (b) as the only possibility. Therefore, $CS_1.\text{last} \rightarrow^c s_1$. Similarly, $CS_2.\text{last} \rightarrow^c s_2$ can be proved. Let $H = \rightarrow^c\text{-glb}(G_1, G_2)$. H contains $CS_1.\text{last}$ and $CS_2.\text{last}$ and, so, $\neg(H)$. Further, H is $\rightarrow^c$-consistent (by the lattice property).

So in either case, $\rightarrow^c$ is not a controlling computation of $B_{mutex}$ in $\rightarrow$.

Theorem 2 (Sufficient Condition) For a computation $\rightarrow$ of S and a global predicate $B_{mutex}$, $\mapsto$ has no cycles $\Rightarrow$ a controlling computation of $B_{mutex}$ in $\rightarrow$ exists Proof: Since $\mapsto$ has no cycles, all of the critical sections can be arranged in a sequence: $CS_1 CS_2, \ldots CS_m$ such that $CS_i \mapsto CS_j \Rightarrow i < j$. Let $\rightarrow^c$ be defined as $(\rightarrow \cup \{(CS_i.\text{last}, CS_{i+1}.\text{first})|1 \leq i \leq m-1\})^+$, where $( )^+$ is the transitive closure. Clearly $\rightarrow \subseteq \rightarrow^c$. In the next paragraph, $\rightarrow^c$ is proved a partial order. Assume that there is a global state G such that $\neg B_{mutex}(G)$. Let $CS_i$ and $CS_j$ be the two critical sections to which s and t belong respectively. w.l.o.g, let $i<j$. Therefore, $s \rightarrow^c t$, and $\neg \rightarrow^c$-consistent(G). Therefore, $\rightarrow^c$-consistent(G) $\Rightarrow B_{mutex}(G)$. So $\rightarrow^c$ is a controlling computation of $B_{mutex}$ in $\rightarrow$.

The remaining obligation of proof is that $\rightarrow^c$ is a partial order. To this end, let $\rightarrow^k$ be defined as: $(\rightarrow \cup \{(CS_i.\text{last}, CS_{i+1}.\text{first})|1 \leq i \leq k-1\})^+$. The following claim can be made: Claim:$\forall 1 \leq k \leq m$: (1)$\rightarrow^k$ is a partial order, and (2) $CS_i \mapsto^k CS_j \Rightarrow i<j$ Clearly $\rightarrow^c = \rightarrow^m$ and so this claim implies that $\rightarrow^c$ is a partial order.

Proof of Claim: (by Induction on k)

Base Case: Immediate from $\rightarrow = \rightarrow^1$.

Inductive Case: We make the inductive hypothesis that $\rightarrow^{k-1}$ is a partial order, and that $CS_i \mapsto^{k-1} CS_j \Rightarrow i<j$. The definition of $\rightarrow^k$ can be rewritten as: $(\rightarrow^{k-1} \cup \{(CS_{k-1}.\text{last}, CS_k.\text{first})\})^+$. First it is demonstrated that $\rightarrow^k$ is irreflexive and transitive (which together imply asymmetry).

(i) Irreflexivity: Let $s \rightarrow^k t$. There are two possibilities: either $s \mapsto^{k-1} t$ or $s \mapsto^{k-1} CS_{k-1}.\text{last} \land CS_k.\text{first} \rightarrow^{k-1} t$. In the first case, the inductive hypothesis indicates that $\mapsto^{k-1}$ is irreflexive and so $s \neq t$. In the second case, part (i) of the inductive hypothesis indicates that $\mapsto^{k-1}$ is transitive, and part (2) of the inductive hypothesis indicates that $CS_k.\text{first} \not\rightarrow^{k-1} CS_{k-1}.\text{last}$ and so $s \neq t$.

(ii) Transitivity: This is immediate from the definition of $\rightarrow^k$.

Therefore, $\rightarrow^k$ is a partial order. The second part of the claim is now illustrated. Suppose $CS_i \mapsto^k CS_j$. This implies that $CS_i.\text{first} \rightarrow^k CS_j.\text{last} \land i \neq j$. There are two cases: either $CS_i.\text{first} \rightarrow^{k-1} CS_j.\text{last} \land i \neq j$ or $CS_i.\text{first} \rightarrow^{k-1} CS_{k-1}.\text{last}$ $\land CS_k.\text{first} \rightarrow^{k-1} CS_j.\text{last} \land i \neq j$. In the first case, we have $CS_i \mapsto^{k-1} CS_j$ and so by the inductive hypothesis, $i<j$. In a similar manner, the second case would give $i \leq k-1 \land k \leq j$ and so $i<j$.

In conclusion, the necessary and sufficient condition for finding a controlling computation for $B_{mutex}$ is that there is no cycle of critical sections with respect to $\mapsto$. Further note that, since the proof of Theorem 2 is constructive, it can be used to design a naive algorithm to find a controlling computation.

The following is an explanation of off-line Readers Writers Problem. Let read_critical and write_critical be functions that map a state onto a boolean value. Further, no state can be both read_critical and write_critical (any read and write locked sate is considered to be only write locked). Let critical(s)≡read_critical(s) $\lor$ write_critical(s). The Off-line Readers Writers Problem is a specialization of the Off-line Predicate Control Problem to the following class of global predicates:

$$B_{rw}(G) \equiv \forall \text{distinct } s,t \in G: \neg(\text{write\_critical}(s) \land \text{critical}(t))$$

Given a read-critical function and a write-critical function on S and a computation $\rightarrow$ on S, we define a read critical section and a write critical section in an analogous fashion to the critical sections that were defined before. Note that, since no state is both read_critical and write_critical, critical sections in a process do not overlap.

Let $\mapsto$ be a relation on both read and write critical sections defined as:

$$CS \mapsto CS' \equiv CS.\text{first} \to^c CS'.\text{last} \wedge CS \neq CS'$$

Theorem 3 (Necessary Condition) For a computation $\to$ of S, and a global predicate $B_{rw}$,

| a controlling computation of $B_{rw}$ in $\to$ exists | => | all cycles in $\to$ contain only read critical sections |
|---|---|---|

Proof: The proof is similar to the proof of Theorem 1. Providing the contrapositive: Let $\mapsto$ have a cycle, say $CS_1 \mapsto CS_2 \mapsto \ldots CS_m \mapsto CS_1$. Without loss of generality, let $CS_1$ be a write critical section. Let $\to^c$ be a computation such that $\to \subseteq \to^c$.

First, there is at least one critical section in the cycle say $Cs_k$ (where $k \neq 1$), such that $CS_1.\text{last} \not\to^c CS_k.\text{first}$ and $Cs_k.\text{lasts} \not\to^c CS_1.\text{first}$. To prove this, assume the opposite:

$$\forall Cs_k\ (k \neq 1): CS_1.\text{last} \to^c Cs_k.\text{first} \vee Cs_k.\text{last} \to^c CS_1.\text{first} \quad\text{—(i)}$$

and prove a contradiction as follows: $Cs_m \mapsto CS_1$ implies $CS_1.\text{last} \not\to^c CS_m.\text{first}$. Therefore, by (i), $Cs_m.\text{last} \to^c CS_1.\text{first}$. This allows the definition of j as the smallest integer such that $Cs_j.\text{last} \to^c CS_1.\text{first}$. $CS_1 \mapsto CS_2$ implies that $CS_2.\text{last} \not\to^c CS_1.\text{first}$. Therefore, $j \neq 2$. In particular, $Cs_{j-1}$ and $CS_1$ are distinct. By the choice of j, $Cs_{j-1}.\text{last} \not\to^c CS_1.\text{first}$. So, using (i), $CS_1.\text{last} \to^c Cs_{j-1}.\text{first}$. We now have a cycle: $CS_1.\text{last} \to^c Cs_{j-1}.\text{first}$ (as above), $Cs_{j-1}.\text{first} \to^c Cs_j.\text{last}$ (since $Cs_{j-1} \mapsto Cs_j$), $Cs_j.\text{last} \to^c CS_1.\text{first}$ (by our choice of j), and $CS_1.\text{first} \to^c CS_1.\text{last}$ (by the definition of first and last) This cycle contradicts the fact that $\to^c$ is a partial order.

Since the existence of a $Cs_k$ has been demonstrated such that $CS_1.\text{last} \not\to^c Cs_k.\text{first}$ and $Cs_k.\text{last} \not\to^c CS_1.\text{first}$, a proof similar to the one in Theorem 1 can be used to show that $\to^c$ is not a controlling computation of $B_{rw}$ in $\to$.

Theorem 4 (Sufficient Condition) For a computation $\to$ of S, and a global predicate $B_{rw}$,

| all cycles in $\to$ contain only read critical sections | => | a controlling computation of $B_{rw}$ in $\to$ exists |
|---|---|---|

Proof: Consider the set of strongly connected components of the set of critical sections with respect to the $\mapsto$ relation. Define the $\hookrightarrow$ relation on strongly connected components as $SCC \hookrightarrow SCC' \neq \exists CS \in SCC, CS' \in SCC': CS \mapsto CS' \wedge SCC \neq SCC'$. It is verifiable that $\hookrightarrow$ is a partial order. Therefore, it can be linearized to get a sequence of all strongly connected components, say $SCC_1, SCC_2, \ldots SCC_l$ such that $SCC_i \hookrightarrow SCC_j \Rightarrow i<j$. Let $\to^c$ be defined as $(\to \cup \{(Cs_i.\text{last}, CS_j.\text{first}) \mid Cs_i \in SCC_k, CS_j \in SCC_{k+1}\ \text{for some}\ 1 \leq k \leq l-1\})^+$. Clearly $\to \subseteq \to^c$. It can be shown that $\to^c$ is a partial order along similar lines as the proof of Theorem 2.

It is shown that $\to^c$ is a controlling computation of $B_{rw}$ in $\to$. Suppose G is a global state such that $\neg B_{rw}(G)$. Therefore, states s and t can be found such that write_critical(s) and critical(t). Let CS be a write critical section that contains s and let CS' be a critical section that contains t. Let $SCC_i$ and $SCC_j$ be the strongly connected components that contain CS and CS' respectively. $SCC_i$ is distinct from $SCC_j$ since, otherwise, there would be a cycle in $\mapsto$ that contains a write critical section. Without loss of generality, let i<j. By the definition of $\to^c$, we have $s \to^c t$ and, therefore, $\neg \to^c$-consistent(G). Therefore, $\to^c$ is a controlling computation of $B_{rw}$ in $\to$.

Note, as before, that the proof of Theorem 4 can be used to design an algorithm to find a controlling computation.

The following is an explanation of off-line Independent Mutual Exclusion. Let $critical_1, critical_2, \ldots critical_m$ be functions that map an event onto a boolean value. The Off-line Independent Mutual Exclusion Problem is a specialization of the Off-line Predicate Control Problem to the following class of global predicates:

$$B_{ind}(G) \equiv \forall \text{distinct } s, t \in G: \forall l: \neg(critical_i(s) \wedge critical_i(t))$$

Given a function $critical_i$ on S and a computation $\to$ on S, an i-critical section is defined in an analogous fashion to the critical sections that were defined before. Note that the definition allows independent critical sections on the same process to overlap. In particular the same set of states may correspond to two different critical sections (corresponding to a critical section with multiple locks). Let $\mapsto$ be a relation on all critical sections defined as before.

Theorem 5 (Necessary Condition)

For a computation $\to$ of S, and a global predicate $B_{ind}$,

| a controlling computation of $B_{ind}$ in $\to$ exists | => | $\to$ has no cycles of i-critical sections, for some i |
|---|---|---|

Proof: The proof is almost identical to the proof of Theorem 1.

Theorem 6 (Sufficient Condition) For a computation $\to$ of S, and a global predicate $B_{ind}$.

| $\to$ has no cycles of i-critical sections, for some i | => | a controlling computation of $B_{ind}$ in $\to$ exists |
|---|---|---|

Proof: The proof is along similar lines to the proof of Theorem 4. In this case strongly connected components are taken as before, but utilize the fact that no two i-critical sections may be in the same strongly connected component (otherwise, there would be a cycle of i-critical sections).

Using similar definitions, the Off-line Independent Read-Write Mutual Exclusion Problem is a specialization of the Off-line Predicate Control Problem to the following class of global predicates:

$$B_{ind\text{-}rw}(G) \equiv \forall \text{distinct } s, t \in G: \forall i: \neg \text{write-}critical_i(s) \wedge critical_i(t))$$

As before, we defined i-read critical sections and i-write critical section ($1 \leq i \leq m$). Similarly, let $\to$ be a relation on all critical selections. The-necessary and sufficient condition is a combination of that of the previous two sections. Since the proofs are similar to the previous ones, we simply state:

Theorem 7 (Necessary and Sufficient Condition)

For a computation $\to$ of $S_i$ and a global predicate $B_{ind\text{-}rw}$,

| a controlling computation of $B_{ind\text{-}rw}$ in $\to$ exists | ≅ | all cycles of i-critical sections in $\to$ contain only read critical sections |
|---|---|---|

FIG. 3 shows the algorithm to find a controlling computation of $B_{ind\text{-}rw}$ in $\to$. Since the other forms of mutual exclusion are special cases of $B_{ind\text{-}rw}$, this algorithm can be applied to any of them.

The input to the algorithm is the computation, represented by n lists of critical sections $C_1, \ldots, C_n$. For now, to simplify presentation, assume that critical sections are totally ordered on each process. Each critical section is represented as its process id, its first and last states, a type identifier cs_id that specifies the critical$_{cs\_id}$ function, and a flag indicating if it is a write or read critical section. The partial order is implicitly maintained by vector clocks associated with the first and last states of each critical section. The algorithm outputs the $\rightarrow^n$ relation specified as a list of ordered pairs of states.

The first while loop of the algorithm builds ordered, a totally ordered set of strongly connected components of critical sections (called scc's from here on). The second while loop simply uses ordered to construct the $\rightarrow^c$ relation.

The goal of each iteration of the first loop is to add an scc, which is minimal w.r.t. $\rightarrow$, to ordered (where $\rightarrow$ is the relation on scc's defined in the proof of Theorem 4). To determine this scc, it first computes the set of scc's among the leading critical sections in $C_1, \ldots C_n$. Since no scc can contain two critical sections from the same process, it is sufficient to consider only the leading critical sections. From the set of scc's, it determines the set of minimal scc's, crossable. In then randomly selects one of the minimal scc's. Finally, before adding the scc to ordered, it must check if the scc is not_valid, where not_valid(crossed) =$\exists cs_1 cs^1 \in$ crossed:cs.cs$^-$id ... cs$_1$.cs_id$\wedge$cs.write_critical. If an invalid scc is found, no controlling computation exists (by Theorem 7).

The main while loop of the algorithm executes p times in the worst case, where p is the number of critical sections in the computation. Each iteration takes $O(n^2)$ since it must compute the scc's. Thus, a simple implementation of the algorithm will have a time complexity of $O(n^2p)$. A better implementation of the algorithm, however, would amortize the cost of computing scc's over multiple iterations of the loop. Each iteration would compare each of the critical sections that have newly reached the heads of the lists with the existing scc's, thus forming new scc's. Each of the p critical section, therefore, reaches the head of the list just once, when it is compared with n−1 critical sections to determine the new scc's. The time complexity of the algorithm with this improved implementation is, therefore, O(np). Note that a naive algorithm based directly on the constructive proof of the sufficient condition in Theorem 7 would take $O(p^2)$. The complexity has been significantly reduced by using the fact that the critical sections in a process are totally ordered.

The algorithm has implicitly assumed a total ordering of critical sections in each process. As noted before, however, independent critical sections on the same process may overlap, and may even coincide exactly (a critical section with multiple locks is treated as multiple critical sections that completely overlap). The algorithm can be extended to handle such cases by first determining the scc's within a process. These scc's correspond to maximal sets of overlapping critical sections. The input to the algorithm would consist of n lists of such process-local scc's. The remainder of the algorithm remains unchanged.

Figure 4:
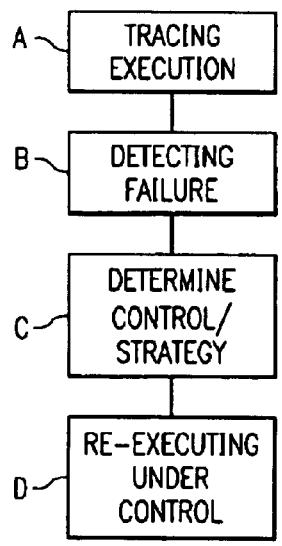
FIG. 4 is an flow diagram showing the main steps of the invention.

Referring to FIG. 4, in its application to software fault tolerance, the present invention consists of four parts: (A) tracing an execution, (B) detecting a synchronization failure, (C) determining a control strategy, and (D) re-executing under control.

After determining a control strategy the algorithm used in the present invention determines which synchronizations to add in order to avoid very general forms of mutual exclusion violation. As mentioned before, the other three parts of our scheme have been addressed as independent problems. All of the pieces are at this point put together for a comprehensive look at how race failures (mutual exclusion violations) can be tolerated.

Figure 5B:
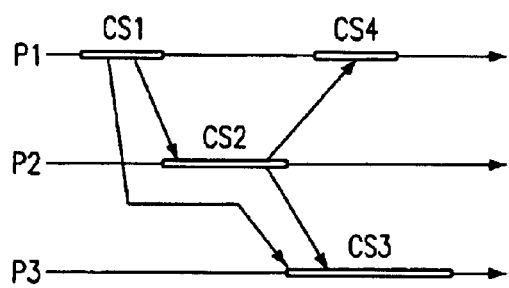

FIG. 5 illustrates an example of tolerating races in a concurrent execution. The problem of determining a control strategy was placed in a very general model of concurrent execution. Tracing, detection, and controlled re-execution, however, depend greatly on the particular concurrent paradigm. A simple example is best chosen to demonstrate the key issues that will arise in most concurrent paradigms.

Consider a distributed system of processes that write to a single shared file. The file system itself does not synchronize accesses and so the processes are responsible for synchronizing their accesses to the file. If they do not do so, the writes may interleave and the data may be corrupted. Since the file data is very crucial, it must be ensured that races can be tolerated.

Synchronization occurs through the use of explicit message passing between the processes. The first part of our mechanism involves tracing the execution. The concern during tracing is to reduce the space and time overhead, so that tolerating a possible fault does not come at too great a cost. In the example, a vector clock mechanism is used, updating the vector clock at each send and receive point. This vector clock needs to be logged for each of the writes to the file (for the algorithm of the present invention). The vector clock values must also be logged for each receive point (for replay purposes). When a write is initiated, and when it returns, the vector clock must be logged. In the example, the writes are typically very long and therefore are performed asynchronously. Thus, execution continues while the write is in progress. In particular, the process may receive a message from another process during its write to the file. Inserting some computation at the send, receive, write initiation, and write completion points can be achieved either by code instrumentation, or by modifying the run-time environment (message-passing interface and the file system interface).

The second part of our mechanism is detecting when a race occurs. Since message passing is used as the synchronization mechanism, the methods described in a Ph.D. thesis by R. H. B. Netzer, entitled "Race condition detection for debugging shared-memory parallel programs," University of Wisconsin-Madison, 1991, are particularly applicable. Once a race has been detected, all processes are rolled back to a consistent global state prior to the race. The file is also rolled back to a version consistent with the rolled-back state of the processes. (A versioned file system with the ability to roll back must be assumed.) The section of the traced vector clock values that occur after the rolled-back state is then noted. The section indicates the critical section entry and exit points required by the algorithm. The algorithm would take O(np) time, where n is the number of processes and p is the number of critical sections that have been rolled back. The output of the algorithm is the set of added synchronizations specified as pairs of critical section boundary points.

Figure 5C:
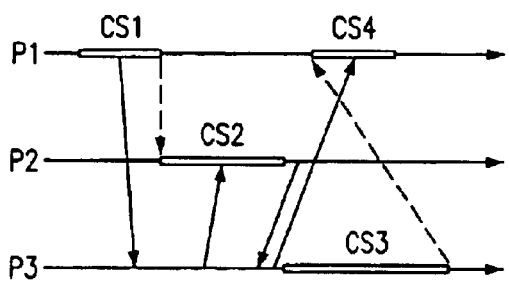

FIG. 5 demonstrates a possible scenario. Here the semantics of mutual exclusion correspond to a single exclusive lock. Therefore, the necessary and sufficient condition is that there are no cycles in the critical section graph shown in FIG. 4(b) Applying the algorithm would add synchronizations to give the controlling computation shown in FIG. 5(c).

The next step is to replay the processes using the logged vector clock values of the receive points. Each receive point must be blocked until the same message arrives as in the previous execution. This is a standard replay mechanism. In addition in this replay, additional synchronizations must be imposed. For example, suppose (s, t) in one of the synchronizations output by our algorithm. The state s is a critical section exit point while t is a critical section entry point.

Each of these additional synchronizations is implemented by a control message sent from s and received before t. Thus, at each critical section exit point, the added synchronizations must be checked to decide if a control message must be sent. At each critical section entry point, the added synchronizations must be checked to decide if the process must block waiting for a control message. As in tracing, the points at which computation must be added are the write initiation and completion points, and the send and receive points. Again, this can be accomplished by code instrumentation or run-time environment modification.

An example has been chosen in which the processes only write to the file. If the processes were to read from the file as well, then that would cause causal dependencies between processes. Then these causal dependencies would have to be tracked as in the tracking for the messages. Another option would be to assume that these causal dependencies do not affect the message communications, in which case, they do not need to be tracked. However, if this approach is taken, it would have to be checked out to determine that the traced computation is the same as the one being replayed. In case of a divergence, the execution would be left to proceed uncontrolled from the point of divergence.

Whereas the invention has been described with respect to specific embodiments thereof, it will be understood that various changes and modifications will be suggested to one skilled in the art and it is intended to encompass such changes and modifications as fall within the scope of the appended claims.

What is claimed is:

1. A method of providing fault tolerance in concurrently executing computer programs by controlling the re-execution of concurrent programs in order to avoid a recurrence of synchronization failures, comprising:
   (a) tracing the execution of concurrent programs to provide tracing information;
   (b) detecting synchronization failures resulting from said execution of the concurrent programs; and
   (c) applying a control strategy, based on said detection of failures, for a re-execution of the concurrent programs said control strategy using the tracing information to add synchronizations during said re-execution, said re-execution of said concurrent programs being based on an automatically formulated computer operation that is derived from information traced during a failed execution.

2. The method of claim 1 wherein said application of a control strategy includes causing a re-execution of said concurrent programs under a control derived from tracing information during an execution, and wherein said control includes using said information to add synchronizations to said concurrent programs during re-execution.

3. The method of claim 2 wherein said control strategy is applied by tracing information during an initial concurrent program execution and using this information to add synchronizations during subsequent re-execution of said concurrent programs.

4. The method of claim 1 wherein said strategy is automatically formulated within a computer system by providing concurrent program failure input to a computer-based algorithm, wherein critical sections of concurrent programs are identified and ordered for each process, each critical section being represented by a process id, its first and last states, a type identifier specifies the critical function, and a flag indicating if it is a write or read critical section.

5. The method of claim 4, wherein a first loop of the algorithm builds a ordered set of strongly connected components of critical sections and a second loop utilizes the ordered set to construct a relationship with concurrent program execution.

6. A method for fault tolerance in concurrently executed software programs, comprising:
   tracing executions of concurrent programs to identify faults and to provide tracing information;
   identifying faults in the execution of said concurrent programs; and
   using controlled re-execution of said concurrent programs based on the identification of faults, said tracing information being used to add synchronizations during the re-execution, and said re-execution of said concurrent programs being based on an automatically formulated computer operation that is derived from said tracing information.

7. The method of claim 6, wherein said controlled re-execution is achieved by tracing information during an initial execution of said concurrent programs.

8. The method of claim 6 wherein said re-execution of said concurrent programs is based on an automatically formulated strategy that is based on information traced during a failed execution.

9. The method of claim 8 wherein said strategy is automatically formulated within a computer by providing concurrent program failure input to a computer-based algorithm, wherein critical sections of concurrent programs are identified and ordered for each process, each critical section being represented by a process id, its first and last states, a type identifier specifies the critical function, and a flag indicating if it is a write or read critical section, and wherein a first analysis by said algorithm builds a ordered set of strongly connected components of critical sections and a second analysis of said algorithm utilizes the ordered set to construct a relationship with concurrent program execution, said first and second analysis resulting in identification of critical section of said concurrent programs requiring assistance.

10. The method of claim 9 wherein said assistance comprises the addition of synchronizations to critical sections of said concurrent programs.

11. A Method of correcting synchronization faults occurring during the execution of concurrent programs, comprising:
   tracing the execution of concurrent programs;
   detecting a synchronization error within the execution of said concurrent programs;
   resetting program processes and associated programs files to a consistent global state prior to said error;
   recording a section of the traced vector clock values that occur after the rolled-back state, wherein said section indicates the critical section entry and exit points required by the algorithm and further indicates failure points within execution of said concurrent programs;
   adding synchronizations specified as pairs of critical section boundary points to identified failures within said sections;
   replaying said concurrent programs using the logged vector clock values of the receive points, wherein each receive point must be blocked until the same message arrives as in the previous execution; and using each of said added synchronizations during said replaying of said concurrent programs to ensure that execution of a critical section of one of said concurrent programs is completed before execution of a critical section of another of said concurrent programs commences.

12. The method of claim 11 wherein additional synchronizations are imposed as needed until successful execution of said concurrent programs is accomplished.

13. A method of providing tolerance to synchronization faults during concurrent execution of computer program components, one of said concurrent program components having a first critical section and another of said concurrent program components having a second critical section, said method comprising the steps of:

tracing the execution of concurrent program components to acquire tracing information pertaining thereto, including information pertaining to a synchronization failure resulting from said execution of said concurrent program components;

using said tracing information to derive one or more synchronizations for use in selectively controlling a re-execution of said concurrent program components; and re-executing said concurrent program components with said derived synchronizations being added to said re-execution, a particular one of said derived synchronizations being operative to ensure that execution of said first critical section is completed before execution of said second critical section commences.

14. The method of claim 12 wherein:

one of said derived synchronizations is implemented by a control message sent from an exit point of said first critical section, and received before an entry point of said second critical section.

* * * * *